United States Patent [19]

Meeker et al.

[11] Patent Number: 5,609,393
[45] Date of Patent: Mar. 11, 1997

[54] RECLINING MECHANISM FOR TODDLER SEAT

[75] Inventors: Paul K. Meeker, Hiram; William R. Gibson, Canton, both of Ohio

[73] Assignee: Lisco, Inc., Tampa, Fla.

[21] Appl. No.: 602,872

[22] Filed: Feb. 6, 1996

Related U.S. Application Data

[63] Continuation of Ser. No. 330,454, Oct. 28, 1994.

[51] Int. Cl.$^6$ .............................. A47C 1/08; B60N 2/26
[52] U.S. Cl. ................. 297/256.13; 297/216.19
[58] Field of Search ......................... 297/256.13, 216.19

[56] References Cited

U.S. PATENT DOCUMENTS

| | | | |
|---|---|---|---|
| 3,948,556 | 4/1976 | Hyde et al. | 297/256.13 |
| 4,058,342 | 11/1977 | Ettridge | 297/256.13 |
| 4,205,877 | 6/1980 | Ettridge | 297/256.13 X |
| 4,376,551 | 3/1983 | Cone | 297/256.13 |
| 4,545,617 | 10/1985 | Drexler et al. | |
| 4,632,456 | 12/1986 | Kassai | |
| 4,709,960 | 12/1987 | Launes | 297/256.13 |
| 4,858,997 | 8/1989 | Shubin | 297/256.13 X |
| 4,915,446 | 4/1990 | Darling et al. | 297/256.13 X |
| 4,936,629 | 6/1990 | Young | 297/256.13 X |
| 4,971,392 | 11/1990 | Young | 297/256.13 X |
| 5,181,761 | 1/1993 | Meeker | 297/256.13 |
| 5,335,964 | 8/1994 | Sedlack et al. | 297/256.13 |
| 5,344,213 | 9/1994 | Koyanagi | 297/256.13 |

*Primary Examiner*—Peter R. Brown
*Assistant Examiner*—Rodney B. White
*Attorney, Agent, or Firm*—Laubscher & Laubscher

[57] ABSTRACT

A toddler carrier comprising a shell having a seat, back and sides, and a separate base. A rigid link pivotally attaches the lower rear of the shell to one end of the base. An axle connects the lower front of the shell to the other end of the base. The sides of the shell include slots which accept the axle. A spring-biased release handle is located beneath the front of the seat with integral release arms angularly located beneath the seat. The release arms are pivotally connected to the shell at their distal ends and have a plurality of notches which selectively mate with the axle. Any notch may be selected by depressing the release handle and pivoting the shell with a subsequent release of the handle.

2 Claims, 3 Drawing Sheets

RECLINING MECHANISM FOR TODDLER SEAT

This application is a continuation of application Ser. No. 08/330,454 filed Oct. 28, 1994.

This invention relates broadly to toddler seats, and more specifically to a toddler seat having a shell mounted on a base, with the shell's tilt angle being easily adjustable.

Car seats for infants and toddlers generally have some mechanisms which allow it to be placed in an upright or reclined position. Typically, there is one upright position, one recline position for facing forward, and one recline position for facing rearward (for infants). The present invention discloses an improved recline mechanism for use with a toddler car seat and base. It is an object of this invention to provide a mechanism which permits reclining of the seat relatively easy and yet allows the recline motion to be accomplished without having to adjust the automobile seat belt which normally secures the toddler seat to the automobile seat. It is a further object of this invention to have a recline handle facing the front of the seat below the seat itself which provides easy access and which is so located that upon release of the recline latch by depressing the recline handle, one is already grasping the seat in the proper area to affect the changing position of the seat.

A further object of this invention is to provide a toddler seat which may be inclined to different positions using a very minimum force. These and other objects of the invention will become apparent from the following description when taken together with the drawings.

SUMMARY OF THE INVENTION

A toddler carrier comprises a shell having a seat, a back, and sides, and a base for supporting the seat. A rigid link pivotally attaches the lower rear of the shell to one end of the base. An axle connects the lower front of the shell to the other end of the base. The sides of the shell include slots which accept the axle and allow movement about the axle. A spring-biased release handle is located beneath the front of the seat with integral release arms angularly located beneath the seat. The release arms have a plurality of notches which selectively mate with the axle. Any notch may be selected by depressing the release handle and pivoting the shell with the subsequent release of the handle.

DETAILED DESCRIPTION OF THE DRAWINGS

Figure 1:
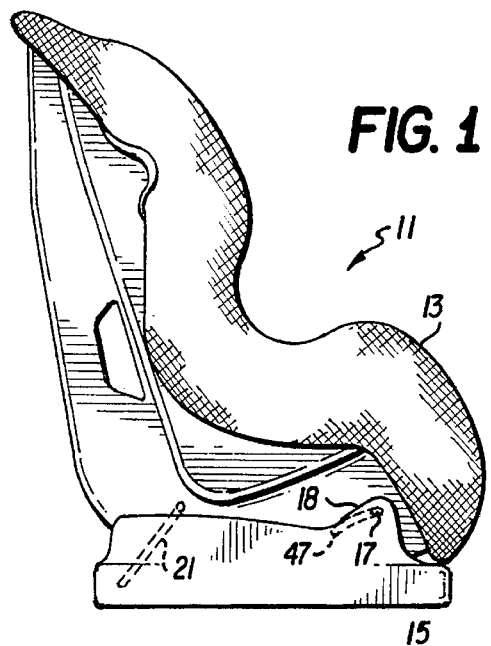
FIG. 1 shows a schematic side view of the carrier of the present invention in its most upright position.
Figure 2:
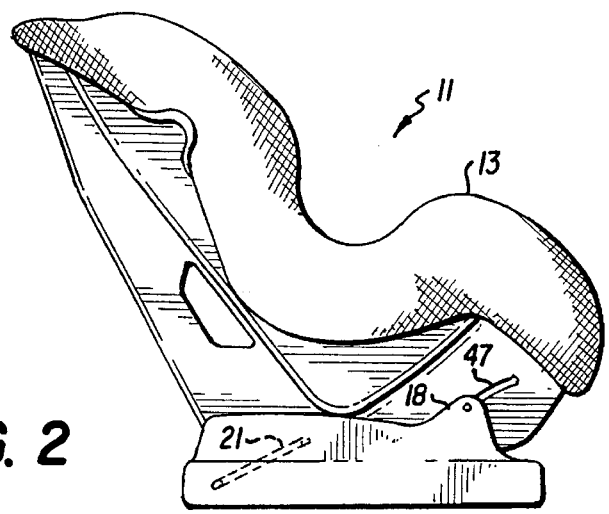
FIG. 2 shows the seat of FIG. 1 in its recline position.

Referring to FIGS. 1 and 2, toddler carrier 11 includes seat shell 13 and base 15. Axle 17 extends through opposed towers 18 of base 15 and passes through the front part of the shell. Each of the sides of the seat shell include slots 47 which accept axle 17 and permit movement of the seat shell, as shown by the two different positions of the seat in FIGS. 1 and 2. Upper horizontal arm 59 may be secured in place by a washer or plate 62.

The rear of the seat is connected by link 21, which will be discussed in detail as the description proceeds.

Figure 3:
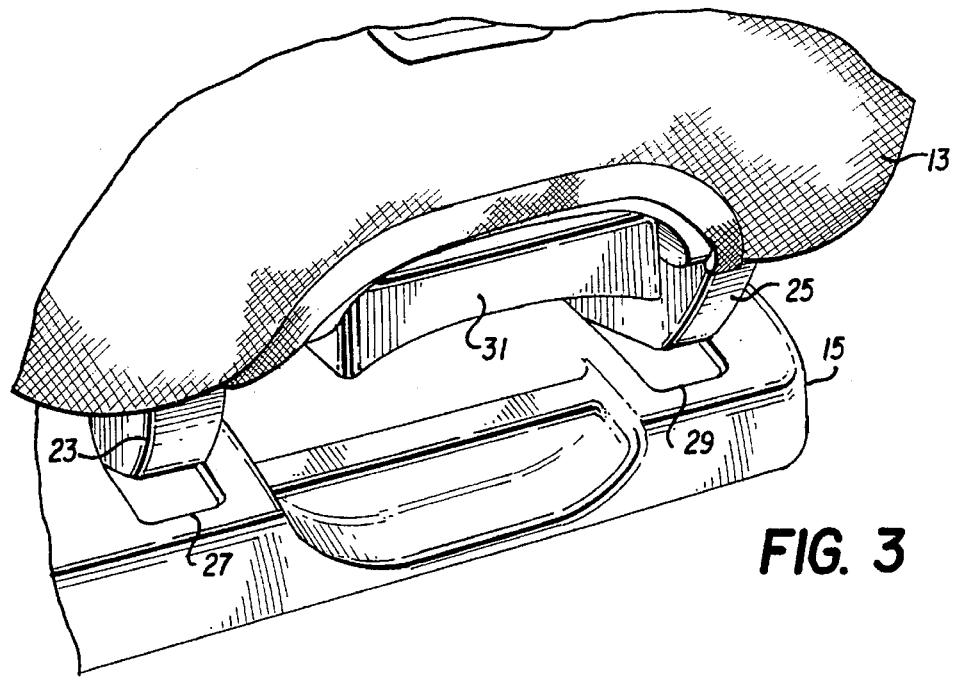
FIG. 3 is an enlarged partial view showing the release handle and lower part of the seat and base relationship.

Referring to FIG. 3, release handle 31 is located beneath the forward part of the seat and legs 23 and 25 depend from the shell and mate with channels 27 and 29 in the base. This leg channel combination keeps the seat shell in alignment with the base while recline adjustment is made.

Referring to FIGS. 4–8, the details of the recline mechanism of the present invention are shown in detail. Release arms 33 and 34 are integral with release handle 31 and extend rearwardly at a selected angle and are pivotally mounted to the interior of the seat at pivot 41. This pivot may be provided individually for each release arm or by use of a rod which extends between the seat legs. Release handle 31 and integral release arms 33 and 34 are biased downwardly by spring 43 so as to maintain the selected notch in the arms in firm contact with axle 17.

Figure 8:
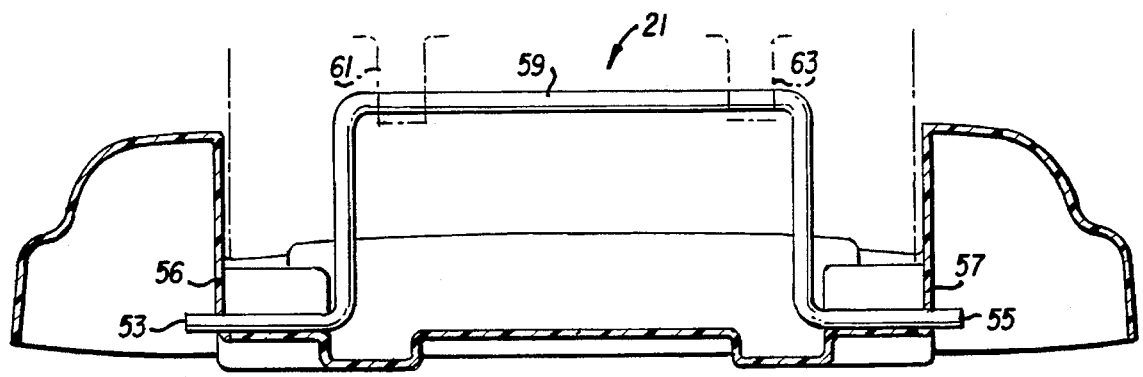
FIG. 8 is a partial sectional view taken through the lines 8—8 of FIG. 4.

Link 21 is located between the rear lower part of the seat shell and the rear end of the base. A specific view of linkage 21 is shown in FIG. 8. Legs 53 and 55 of link 21 rest in channels 27 and 29 of base 15. Upper horizontal arm 59 of link 21 rests in depending bosses 61 and 63, which are integral with the car seat. This permits legs 53 and 55 to pivot in channels 27 and 29 and upper arm 59 to pivot in the dependent bosses 61 and 63 of the car seat.

Figure 4:
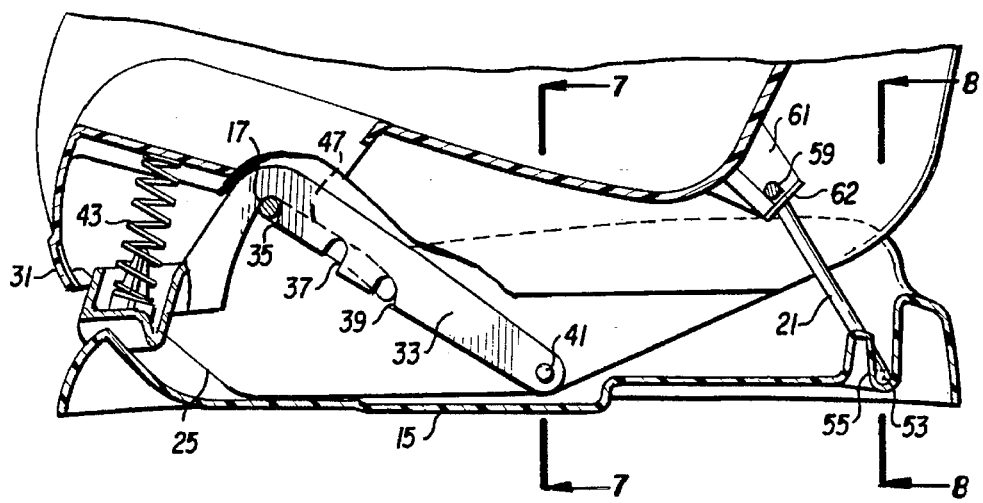
FIG. 4 is a partial section view of the mechanism of the present invention with the seat in its upright position.
Figure 5:
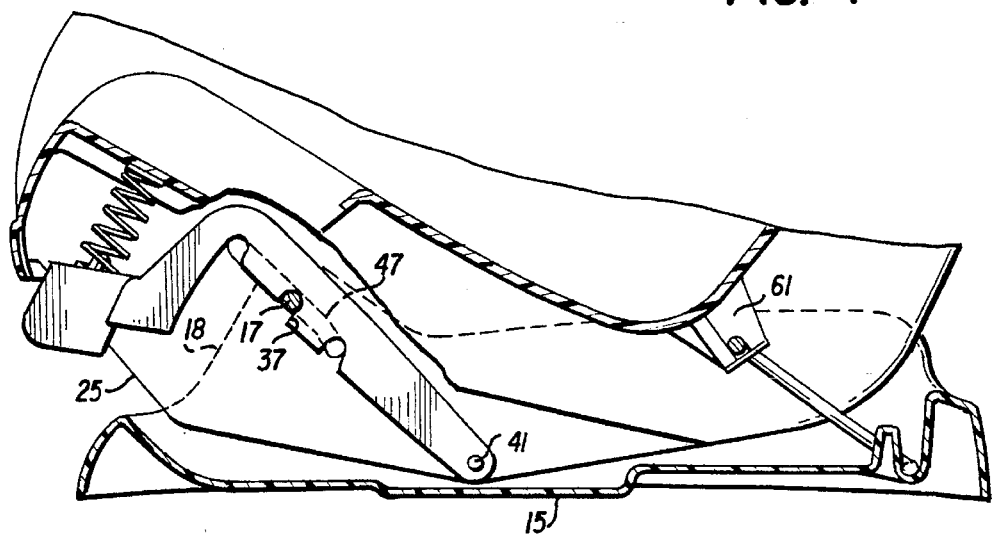
FIG. 5 is a view similar to FIG. 4 with the seat in its intermediate position.
Figure 6:
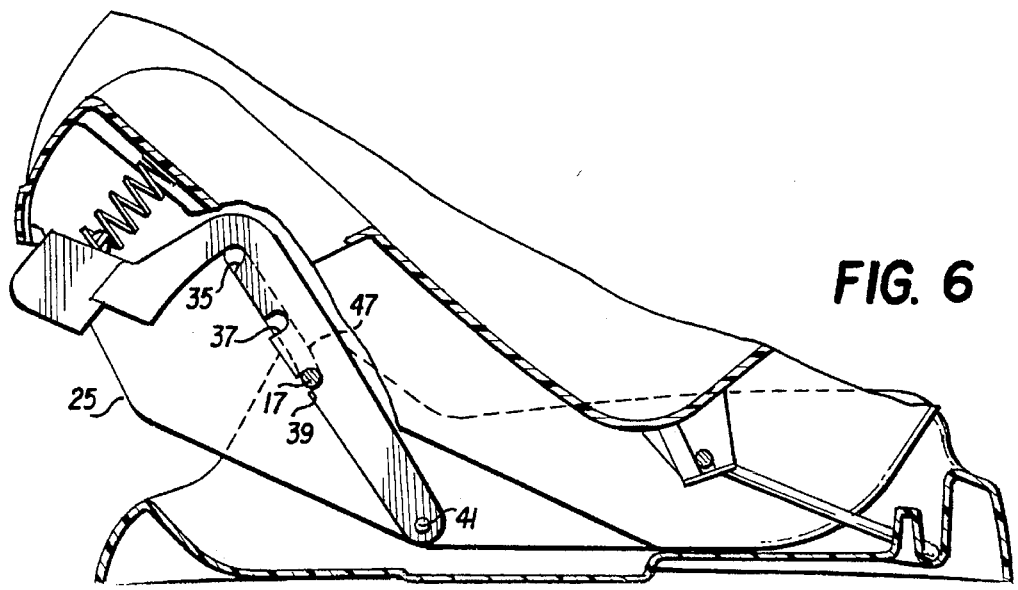
FIG. 6 is a view of FIG. 4 with the seat in its recline position.
Figure 7:
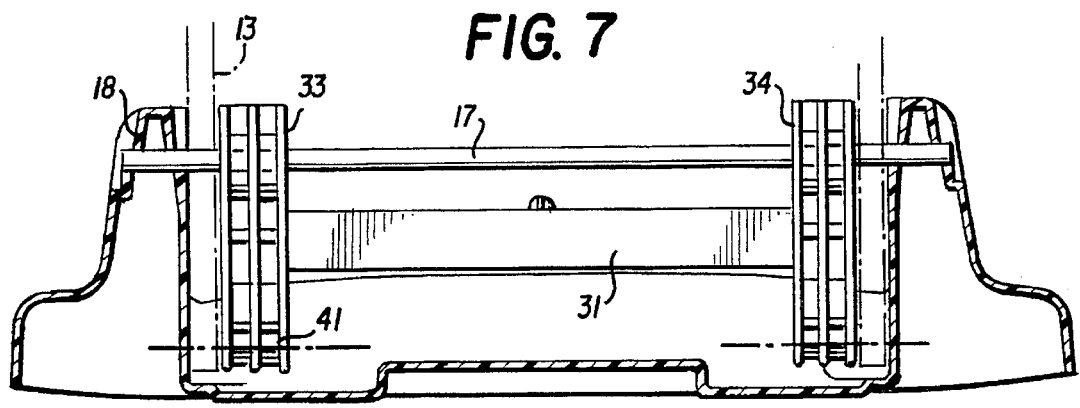
FIG. 7 is a partial section view taken through the lines 7—7 of FIG. 4.

FIG. 4 shows the car seat in its most upright position wherein notch 35 is mated with axle 17 and spring 43 biases release handle 31 downwardly so as to maintain the notch in positive contact with the axle.

By depressing release handle 31 so as to release arm 33 about pivot 41, notch 35 is cleared from axle 17. Raising of the seat shell in the same movement allows the seat to be moved in an upward direction due to slot 47 in the seat. In FIG. 5 handle 31 has again been released so that middle notch 37 meets with axle 17, placing the seat in an intermediate recline position.

The same operation results in the seat being in its ultimate recline position with notch 39 mating with axle 17. In order to return the seat to either the intermediate or the upright position, the operation is repeated but the front of the seat is lowered instead of raised.

With the mechanism of the present invention in use, tilt adjustment of the seat is accomplished with minimum effort and with very small movement of the shell itself relative to the seat of the automobile. Additionally, this movement may be accomplished with minimal adjustment of the automobile seat belt (not shown). Further, the fact that the release handle is at the front of the seat further simplifies the tilting operation due to its easy access. Additional convenience is provided in that the same motion substantially is provided easily since one is already grasping the handle when the desired tilting movement is to be instigated.

Figure 9:
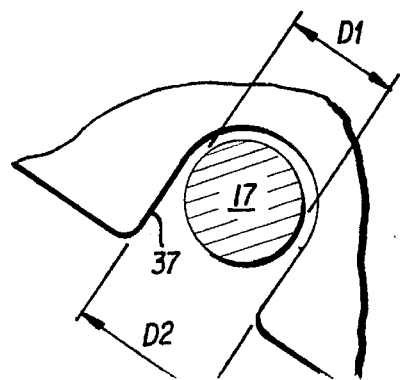
FIG. 9 is a schematic illustration of the notch and axle parameters.

It is preferable that the notches be crescent-shaped so that they effectively grasp the axle running from one tower to the other tower in the base. A schematic illustration of one of the notches is shown in FIG. 9, wherein the diameter of notch opening $D_2$ is greater than the diameter $D_1$ of axle 17.

The above description and drawings are illustratively only since individual components may be modified or substituted while still maintaining the functional results as described. Accordingly, the scope of the invention is to be limited only by the following claims.

We claim:

1. A toddler carrier comprising a shell having a seat, a back, opposed sides, and opposed leg members extending downwardly from said seat, said leg members having a front and a rear, said seat having a front and a rear, said leg members being located at the front of said seat;

opposed elongated slots in said front of said leg members;

a base having a front end and a rear end, said base having opposed upwardly extending towers at said front end;

a rigid link member for attaching said shell to said rear end of said base at said rear of said seat, said link pivotally connecting said shell to said base;

an axle extending through said opposed elongated slots in said leg members and opposed towers of said base;

a slot in the sides of said shell for acceptance of said axle;

a release handle having an integral pair of release arms extending at a predetermined angle from said handle, said release arms being pivotally secured to said shell;

a plurality of notches in said release arm, said notches being configured so as to releasably mate with said axle;

a spring between said shell and said release handle for biasing said notches into a mating position with said axle;

whereby said notches may be selectively aligned with said axle by depression of said release handle and pivoting said shell in a selected direction.

2. A toddler carrier comprising a shell having a back, sides, and a seat, said seat having a front and a rear;

a base having a front end and a rear end;

a linking member for pivotally connecting said rear of said seat to said rear end of said base;

an axle securing said front end of said base to said shell at said front of said seat;

elongated slots in said sides of said shell for acceptance of said axle;

a spring-biased release handle located below said front of said seat, said handle including a pair of release arms integral therewith and extending at an angle below said seat, said release arms being pivotally connected to said shell;

a plurality of notches in each of said arms, said notches being selectively engageable with said axle;

whereby engagement of a selected notch with said axle may be accomplished by depressing said release handle and pivoting said shell.

* * * * *